(12) United States Patent
Someya et al.

(10) Patent No.: US 7,806,041 B2
(45) Date of Patent: Oct. 5, 2010

(54) LINEAR ACTUATOR

(75) Inventors: Mitsuhiro Someya, Moriya (JP);
Masayuki Hosono, Toride (JP);
Kouichirou Kanda, Tsukuba (JP);
Yoshihiro Toshimori, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 395 days.

(21) Appl. No.: 11/930,061

(22) Filed: Oct. 30, 2007

(65) Prior Publication Data

US 2008/0127817 A1 Jun. 5, 2008

(30) Foreign Application Priority Data

Nov. 30, 2006 (JP) ............................. 2006-322890

(51) Int. Cl.
*F16H 43/00* (2006.01)
*F15B 15/14* (2006.01)

(52) U.S. Cl. ........................................ 92/146; 92/169.1

(58) Field of Classification Search .................. 92/5 R, 92/88, 146, 169.1
See application file for complete search history.

(56) References Cited

U.S. PATENT DOCUMENTS

| | | | |
|---|---|---|---|
| 4,682,535 A | | 7/1987 | Stoll |
| 5,884,549 A | * | 3/1999 | Hosono et al. ................. 92/88 |
| 6,336,390 B1 | | 1/2002 | Sato et al. |
| 6,345,568 B1 | * | 2/2002 | Wakasugi et al. ............. 92/146 |
| 7,444,922 B2 | * | 11/2008 | Harashima et al. ............. 92/88 |

FOREIGN PATENT DOCUMENTS

| | | |
|---|---|---|
| JP | 10-061614 | 3/1998 |
| JP | 3066317 | 5/2000 |
| JP | 3795968 | 4/2006 |
| KR | 10-2001-0067215 | 7/2001 |

* cited by examiner

*Primary Examiner*—Thomas E Lazo
(74) *Attorney, Agent, or Firm*—Paul A. Guss

(57) ABSTRACT

A cylinder body includes a first guide surface made up from first guide grooves and a first bulging portion, wherein a slide table is displaceably supported on the first guide surface via a guide mechanism. Additionally, guide members of a guide block that constitutes the guide mechanism are inserted into and fixed within the first guide grooves. Further, the cylinder body is equipped with a second guide surface, which is formed with substantially the same shape as the first guide surface. In the event that the first guide surface is oriented upwardly and the slide table is installed thereon, the second guide surface acts as a mounting surface, whereas, in the event that the second guide surface is oriented upwardly and the slide table is installed thereon, the first guide surface acts as the mounting surface.

16 Claims, 12 Drawing Sheets

LINEAR ACTUATOR

BACKGROUND OF THE INVENTION

1. Field of the Invention

The present invention relates to a linear actuator for effecting reciprocating movement of a slide table along an axial direction of a cylinder main body by introducing a pressure fluid from fluid inlet/outlet ports.

2. Description of the Related Art

Heretofore, a linear actuator made up, for example, from a fluid pressure cylinder or the like has been used as a transport mechanism for various workpieces. The linear actuator serves to transport workpieces loaded and positioned on a slide table by reciprocal displacement of the slide table along a cylinder body.

As disclosed in the specification of Japanese Patent No. 3795968, the present applicant has proposed a linear actuator having ports for supply and discharge of pressurized air from a side surface of the cylinder main body, an adjuster that can adjust a displacement amount of the slide table, and a sensor groove in which a sensor capable of detecting the displacement amount of the slide table is installed.

With such a linear actuator, in order to use the actuator as desired, there are requests to vary the arrangement of the ports, the adjuster and the like, with respect to symmetrical side surfaces on the cylinder main body, corresponding to the use environment as well as the intended purpose of use thereof. In this case, another linear actuator is prepared having the ports, adjuster and the like provided on respective opposite side surfaces thereof, which is then exchanged with the original linear actuator. However, since it is necessary to prepare two types of linear actuators, equipment costs are increased, and in addition, since it is necessary to use only one of the linear actuators at a time, space is required for storage of the other linear actuator, thus making management thereof troublesome.

For solving such a problem, for example, as disclosed in Japanese Patent No. 3066317, a linear actuator is known in which ports, adjuster installation members, and sensor grooves are formed respectively beforehand with respect to both side surfaces of the cylinder body, thereby enabling either one to be used selectively, depending on the intended use or application of the linear actuator.

However, with the above conventional technique, since respective ports, sensor grooves for attachment of sensors, and installation members for adjusters are disposed respectively with respect to both side surfaces of the cylinder body, it is necessary to ensure that both side surfaces have a large size, and along therewith, the cylinder body becomes larger in scale. As a result, the overall linear actuator body itself becomes large in size.

SUMMARY OF THE INVENTION

A general object of the present invention is to provide a linear actuator in which the cylinder body is not made large in size, yet wherein the assembly direction of the cylinder body with respect to the slide table can be selectively varied corresponding to the environment of use of the linear actuator.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
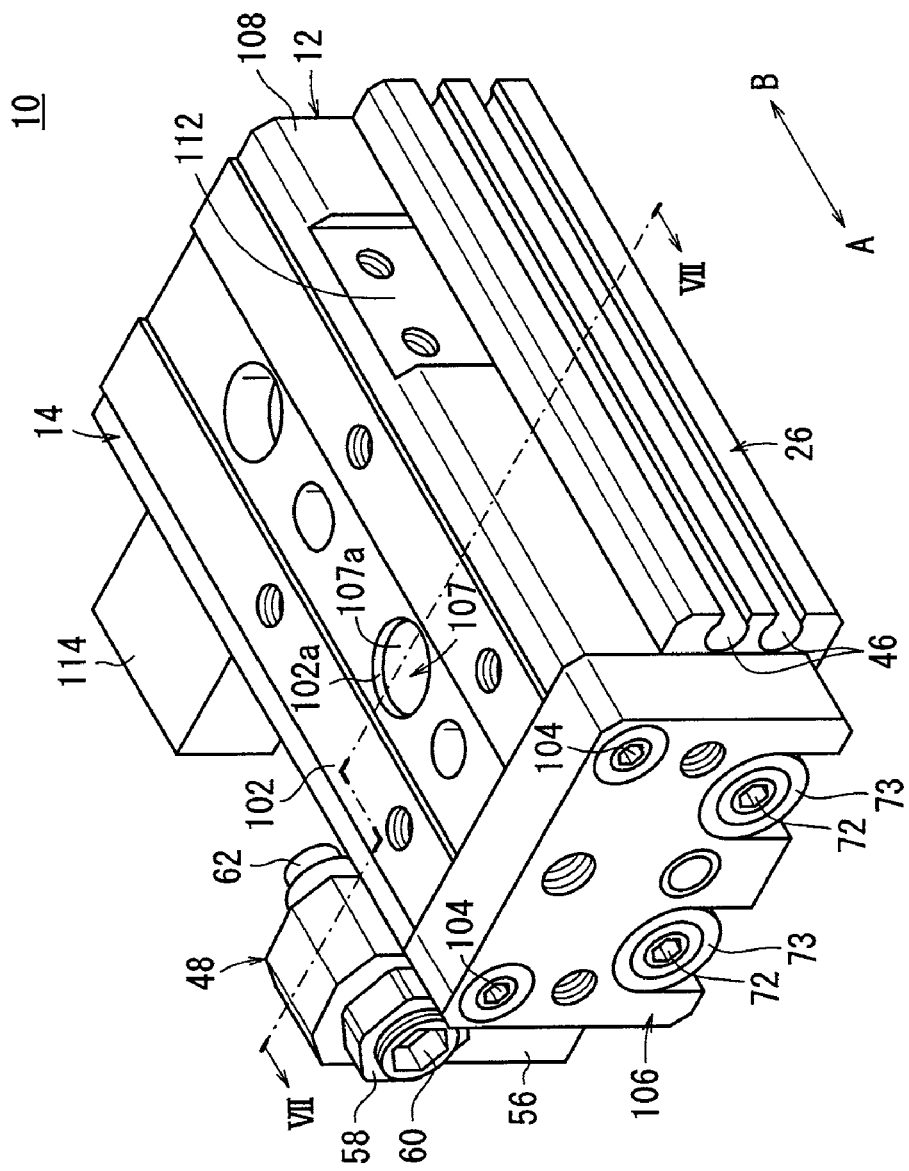
FIG. 1 is an exterior perspective view showing a linear actuator in accordance with an embodiment of the present invention.
Figure 2:
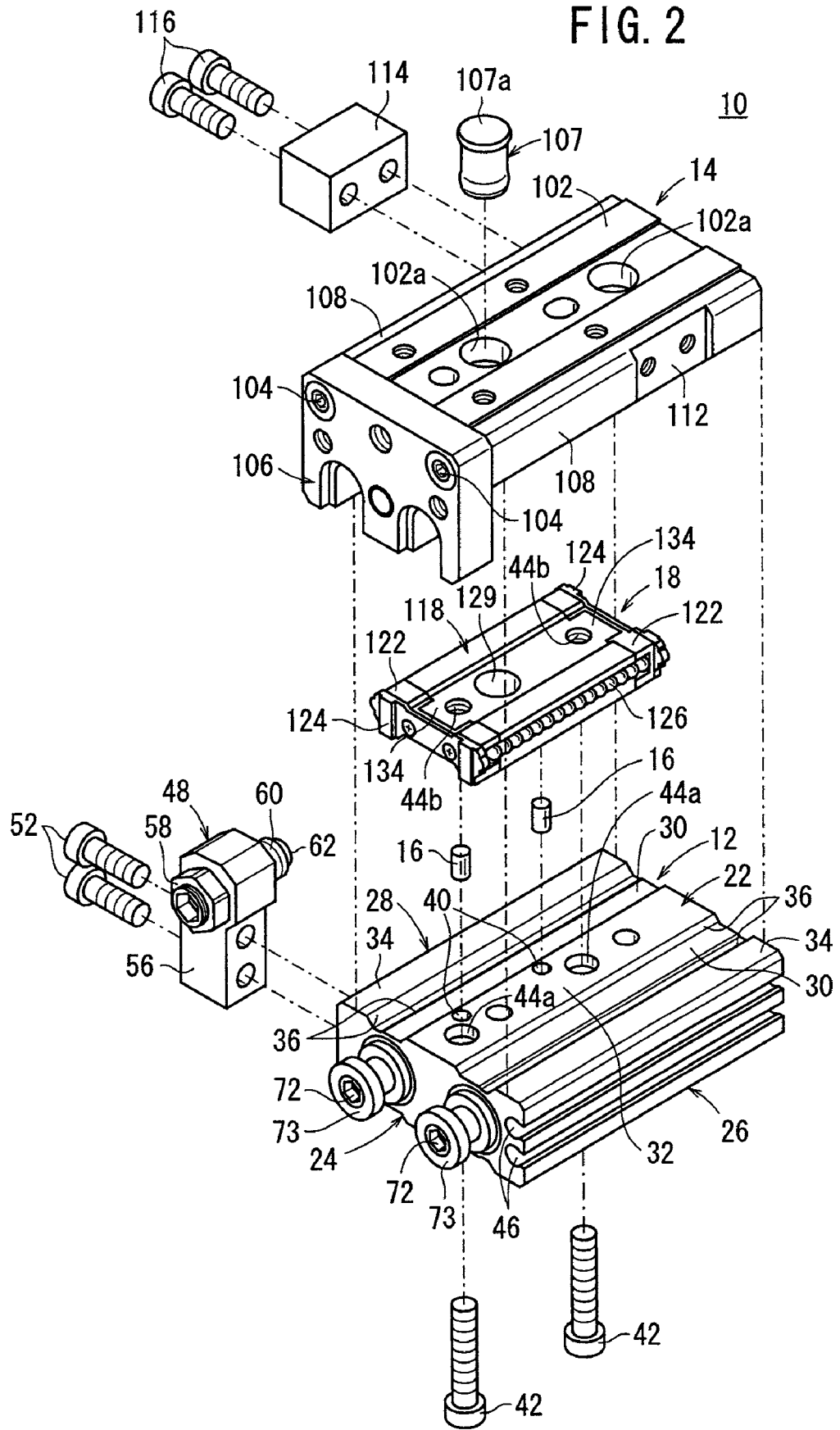
FIG. 2 is an exploded perspective view of the linear actuator shown in FIG. 1.
Figure 3:
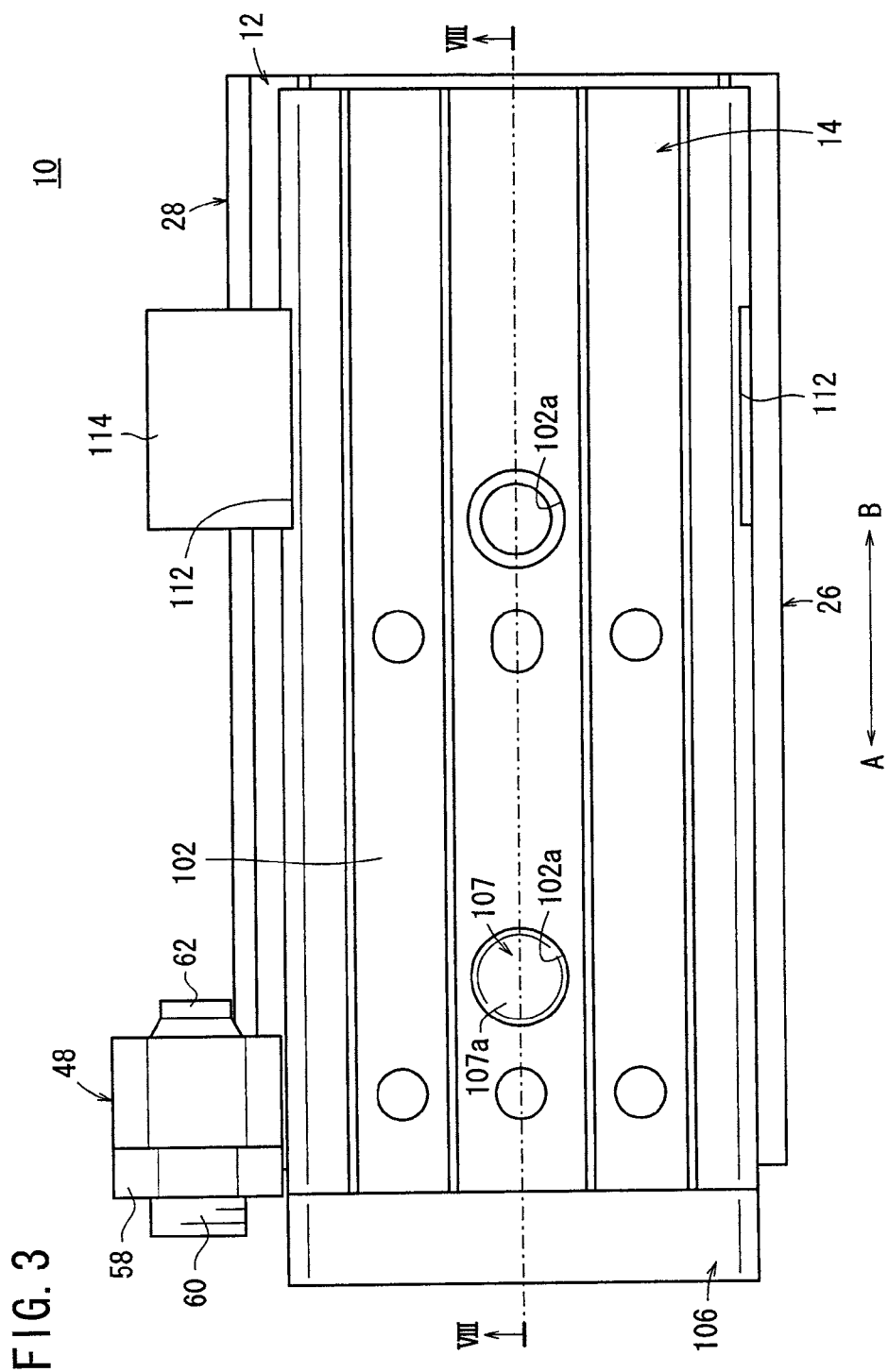
FIG. 3 is a top plan view of the linear actuator shown in FIG. 1.

In FIG. 1, reference numeral 10 indicates a linear actuator according to an embodiment of the present invention.

Figure 4:
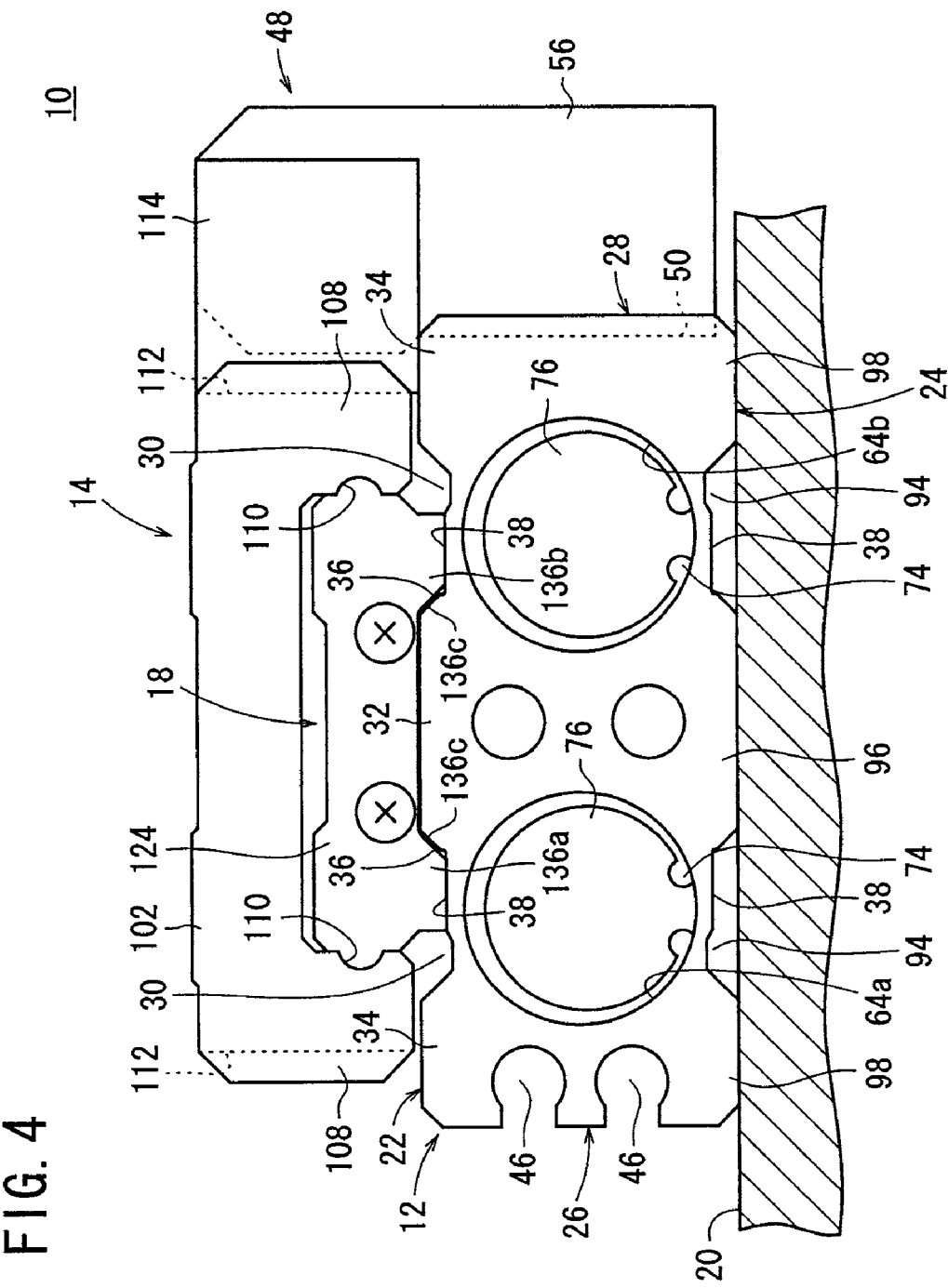
FIG. 4 is a side view showing a state in which the linear actuator of FIG. 1 is fixed to an attachment surface.
Figure 5:
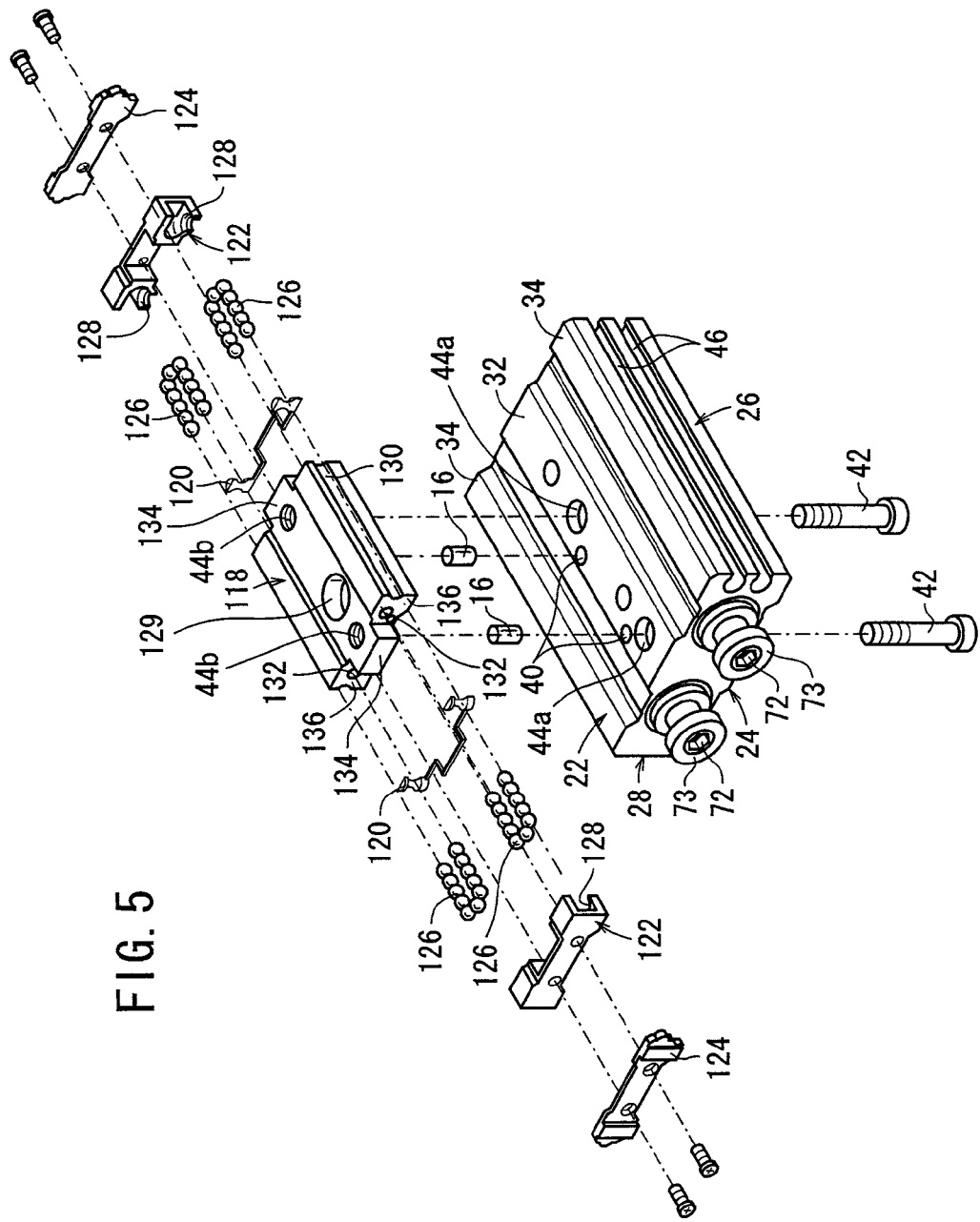
FIG. 5 is an exploded perspective view in which a cylinder body and a guide mechanism of the linear actuator of FIG. 1 are disassembled.

The linear actuator 10, as shown in FIGS. 1 to 7, includes a cylinder body 12 having a roughly rectangular shape in cross section, a slide table 14 that is reciprocally displaceable along an axial direction of the cylinder body 12, and a guide mechanism 18 installed between the cylinder body 12 and the slide table 14, and which is maintained on the cylinder body 12 through a pair of pin members (positioning mechanisms) 16. Further, as shown in FIG. 4, an explanation is given concerning a case in which the linear actuator 10 is affixed such that a second guide surface 24 thereof, formed by a lower side of the cylinder body 12, is made to abut against an installation surface 20 of another apparatus (not shown).

The cylinder body 12 is made up of first and second guide surfaces (guide surfaces) 22, 24 formed with a wide shape extending in a substantially horizontal direction, and which are capable of supporting the guide mechanism 18, and first and second side surfaces (side surfaces) 26, 28 formed with narrow widths, and oriented substantially perpendicular to the first and second guide surfaces 22, 24.

The first guide surface 22 is arranged on an upper side of the cylinder body 12, wherein the first guide surface 22 includes thereon a pair of first guide grooves (grooves) 30, which extend along the axial direction and are recessed a predetermined depth, a first bulging portion 32 disposed between the first guide grooves 30, and a pair of first mounting sections 34, which are disposed on outer sides of the first guide grooves 30. The first guide surface 22 is formed symmetrically about the first bulging portion 32, which is taken as the center, the first bulging portion 32 being formed in a central region of the cylinder body 12.

The first guide grooves 30 include tapered surfaces 36, which are inclined so as to gradually expand in width toward the side of the first bulging portion 32. The tapered surfaces 36 are formed respectively having substantially the same angles with respect to the bottom surfaces of the first guide grooves 30. The bottom surfaces of the first guide grooves 30 function as support surfaces 38, which serve to support a guide block 118 of the guide mechanism 18.

Further, the end surfaces of the first bulging portion 32 are formed as planar surfaces substantially uniform with the end surfaces of the first mounting sections 34. More specifically, on the first guide surface 22, a pair of first guide grooves 30 separated by a predetermined distance and sandwiching the first bulging portion 32 therebetween are recessed a predetermined depth into the first guide surface 22, and in addition, a pair of first mounting sections 34 disposed on outer sides of the first guide grooves 30 are formed with substantially the same height as the first bulging portion 32. Stated otherwise, the first guide surface 22 is formed with a projecting and recessed shape, from the first bulging portion 32, the first guide grooves 30, and the first mounting sections 34.

Furthermore, a pair of first pin insertion holes 40, into which pin members 16 are inserted, are formed on the first bulging portion 32 separated by a predetermined distance, and a pair of attachment holes 44a that penetrate through the cylinder body 12 and through which connecting screws 42 are inserted for attaching the guide mechanism 18 to the cylinder body 12, are formed adjacent to the first pin insertion holes 40.

Figure 6:
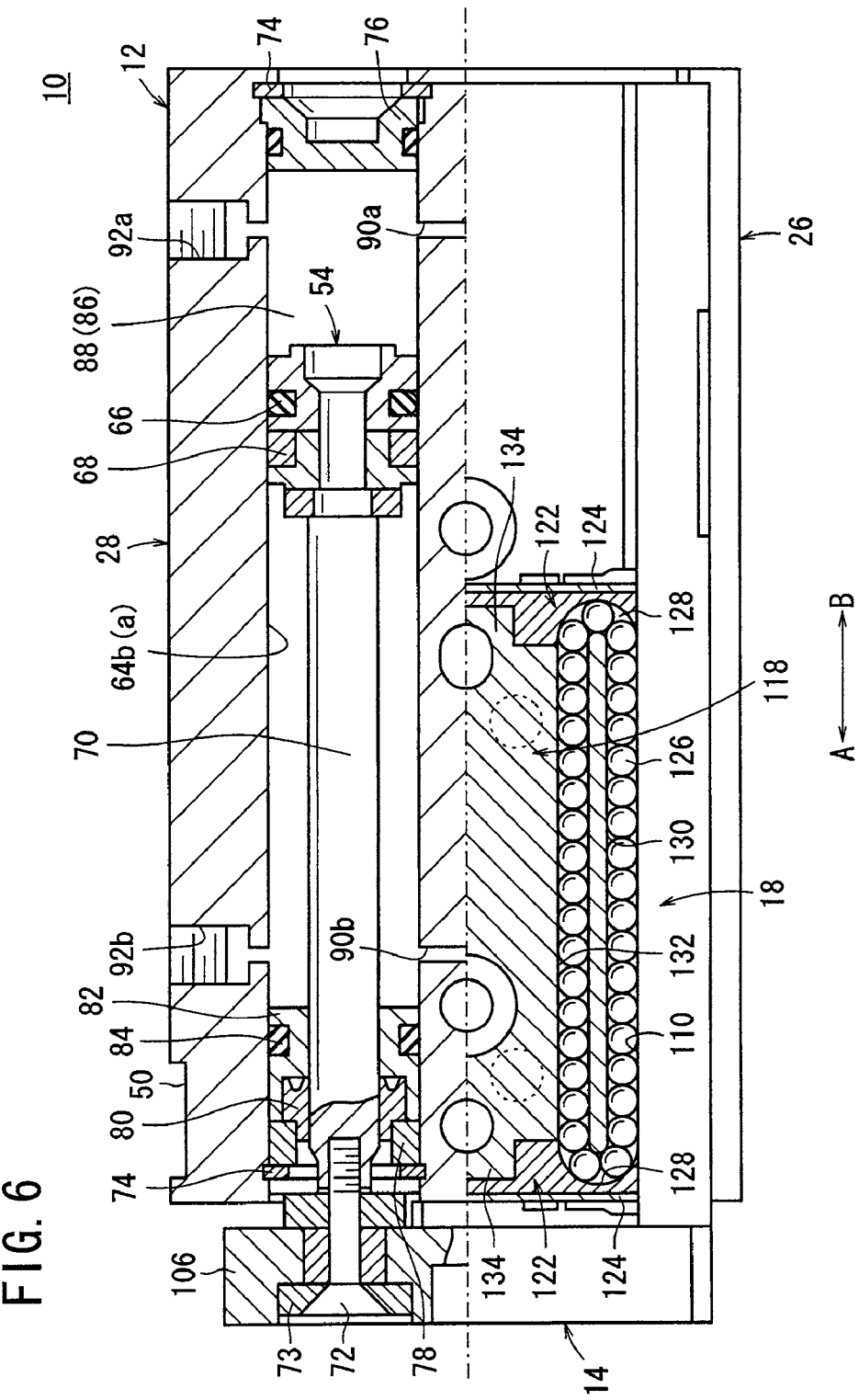
FIG. 6 is a partial transverse cross sectional view taken along an axial direction of the linear actuator shown in FIG. 1.

A pair of sensor attachment grooves (installation grooves) 46, extending along the axial direction, are formed on the first side surface 26 of the cylinder body 12, and a first recess 50 for attachment of the adjuster 48 that regulates the displacement amount of the slide table 14 is formed on the second side surface 28 of the cylinder body 12, wherein the adjuster 48 is installed in the first recess 50 by means of screws 52 (see FIG. 6). Sensors (not shown), which are capable of detecting the position of the pistons 54 arranged inside the cylinder body 12, are mounted in the sensor attachment grooves 46.

The adjuster 48 includes a block 56, an adjustment bolt 60 threaded into a hole of the block 56 and affixed to the block 56 through a nut 58, and a damper 62 installed and mounted on one end of the adjustment bolt 60. In addition, the displacement amount of the slide table 14 in the axial direction is arbitrarily adjusted by screw-rotating the adjustment bolt 60 with respect to the block 56, and thereby adjusting a projecting amount by which the adjustment bolt 60 projects from the block 56.

On the other hand, a pair of penetrating holes 64a, 64b disposed roughly parallel to the axial direction are formed at the interior of the cylinder body 12. Pistons 54, on which a piston packing 66 and a magnetic body 68 are installed on an outer peripheral surface thereof, and piston rods 70 connected to the pistons 54, are disposed in a displaceable manner respectively inside the penetrating holes 64a, 64b. Floating bushes 73 are connected through screws 72 respectively to ends of the piston rods 70, and the pistons 54 are connected respectively to other ends of the piston rods 70.

Ends of the penetrating holes 64a, 64b are closed by end caps 76, which are installed in the ends via fastening rings 74, whereas the other ends of the penetrating holes 64a, 64b are closed by rings 78, rod packings 80 and collars 82, which are maintained therein via fastening rings 74. O-rings 84 are fitted onto the outer circumferential surfaces of the collars 82 through annular grooves. As a result, an airtight condition inside each of the penetrating holes 64a, 64b is maintained respectively by the end caps 76 and the collars 82.

Further, a first cylinder chamber 86 and a second cylinder chamber 88, which are closed by the end caps 76 and the collars 82, are defined respectively inside the pair of penetrating holes 64a, 64b. The first and second cylinder chambers 86, 88 mutually communicate through a pair of communication passages 90a, 90b formed between the pair of penetrating holes 64a, 64b. Furthermore, a pair of fluid inlet/outlet ports 92a, 92b, which are separated by a predetermined distance, are formed on the second side surface 28 on the cylinder body 12. The fluid inlet/outlet ports 92a, 92b are formed so as to communicate respectively with both end sides of the second cylinder chamber 88, with the piston 54 interposed therebetween (see FIG. 6).

On the other hand, the second guide surface 24 that forms the lower side of the cylinder body 12 has the same shape as the first guide surface 22, and includes a pair of second guide grooves (grooves) 94 extending in the axial direction and recessed a predetermined depth into the second guide surface 24, a second bulging portion 96 disposed between the second guide grooves 94, and a pair of second mounting sections 98, which are disposed on outer sides of the second guide grooves 94. The second guide surface 24 is formed symmetrically about the second bulging portion 96, which is taken as the center, the second bulging portion 96 being formed in a central region of the cylinder body 12.

Further, the end surfaces of the second bulging portion 96 are formed as planar surfaces substantially uniform with the end surfaces of the second mounting sections 98. More specifically, on the second guide surface 24, a pair of second guide grooves 94 separated by a predetermined distance and sandwiching the second bulging portion 96 therebetween are recessed a predetermined depth into the second guide surface 24, and in addition, a pair of second mounting sections 98 disposed on outer sides of the second guide grooves 94 are formed with substantially the same height as the second bulging portion 96. Stated otherwise, the second guide surface 24 is formed with a projecting and recessed shape, from the second bulging portion 96, the second guide grooves 94, and the second mounting sections 98.

Furthermore, a pair of second pin insertion holes 100, separated by a predetermined distance and into which pin members 16 can be inserted, are formed in the second bulging portion 96. A pair of attachment holes 44a penetrates therethrough, at regions adjacent to the second pin insertion holes 100.

The slide table 14 which is roughly L-shaped in cross section, is formed by a table main body 102 disposed on the first guide surface 22 of the cylinder body 12, and an end plate 106 connected perpendicularly to the table main body 102 by a pair of bolts 104. Floating bushes 73 are maintained in the end plate 106 through semi-circular shaped openings. As a result, the pair of pistons 54 arranged inside the cylinder body 12 and the slide table 14 are interconnected through the piston rods 70 and the floating bushes 73 (see FIG. 6).

Figure 8:
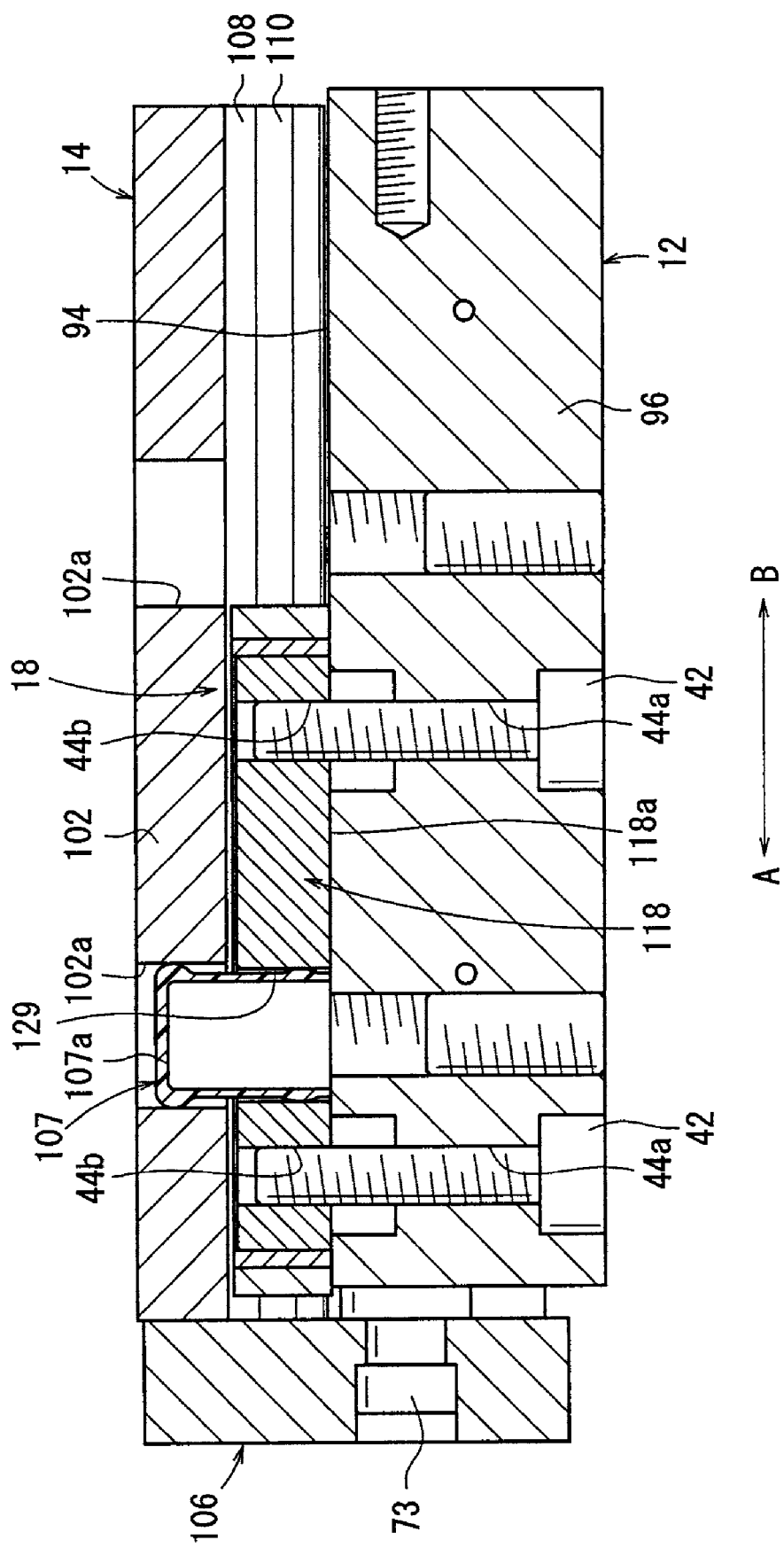
FIG. 8 is a cross sectional view taken along line VIII-VIII of FIG. 3.

The table main body 102 is formed to be roughly U-shaped in cross section, and first holes 102a, separated by a predetermined distance, are formed on an upper surface thereof onto which, for example, a workpiece (not illustrated) is to be placed. A cap (connecting member) 107, which is capable of positioning the slide table 14 and a guide block 118, to be discussed later, may be inserted into the first hole 102a (see FIG. 8). The cap 107 is made, for example, from an elastic material such as rubber or the like, and is formed in the shape of a bottomed cylinder. The cap 107 is inserted into the first hole 102a from the open end side thereof, such that the first hole 102a is closed by the bottom part 107a of the cap 107.

Further, the table main body 102 includes a pair of supporting members 108, which project substantially perpendicularly toward the cylinder body 12 from both sides of the table main body 102. Ball rolling grooves 110 extending along the axial direction are formed on mutually facing inner wall surfaces of the supporting members 108 (see FIG. 7).

Further, second recesses 112, recessed respectively at a predetermined depth, are formed in both side surfaces that run along the axial direction of the table main body 102. A stopper block 114, having a rectangular parallelepiped shape, is fixed by screws 116 in one of the second recesses 112. As a result, the stopper block 114 is displaced integrally with the slide table 14. Additionally, the displacement amount of the slide table 14 in the axial direction is regulated by abutment of the stopper block 114 against the adjuster 48, which is mounted on the cylinder body 12.

The guide mechanism 18 includes a flat shaped guide block 118, respective pairs of ball return members 120, cover members 122 and scrapers 124, which are mounted respectively on both ends along the axial direction of the guide block 118, and a pair of pin members 16, which maintain the guide block 118 on the cylinder body 12. Semicircular ball return grooves 128 are formed in the cover members 122, thus causing the ball bearings 126 to be circulated through co-action with the ball return members 120.

A second hole 129 that penetrates through the guide block 118 is formed so as to face toward a first hole 102a of the slide table 14. More specifically, the table main body 102 is arranged on top of the guide block 118, so that by inserting the cap 107 into the second hole 129 through the first hole 102a, the cap 107 is maintained in the first and second holes 102a, 129 by the elastic force, such that the slide table 14 including the table main body 102 is connected integrally with the guide block 118.

Further, ball rolling grooves 130 (see FIG. 5) are formed along the axial direction on both side surfaces of the guide block 118, and a pair of ball circulation holes 132, separated by a predetermined distance, and which penetrate in the axial direction, are formed at regions adjacent to the ball rolling grooves 130.

More specifically, the ball circulation passages are constructed by connecting the ball rolling grooves 110 formed in the supporting members 108 of the table main body 102, the ball rolling grooves 130 of the guide block 118, the ball circulation holes 132, and the ball return grooves 128 of the cover members 122. The slide table 14 arranged on top of the guide mechanism 18 can be smoothly moved reciprocally by rolling of the plural ball bearings 126 along the ball circulation passages. Projections 134, which project with substantially rectangular shapes in cross section, are formed on both ends of the guide block 118, wherein the projections 134 engage within the cover members 122 (see FIG. 10).

Figure 7:
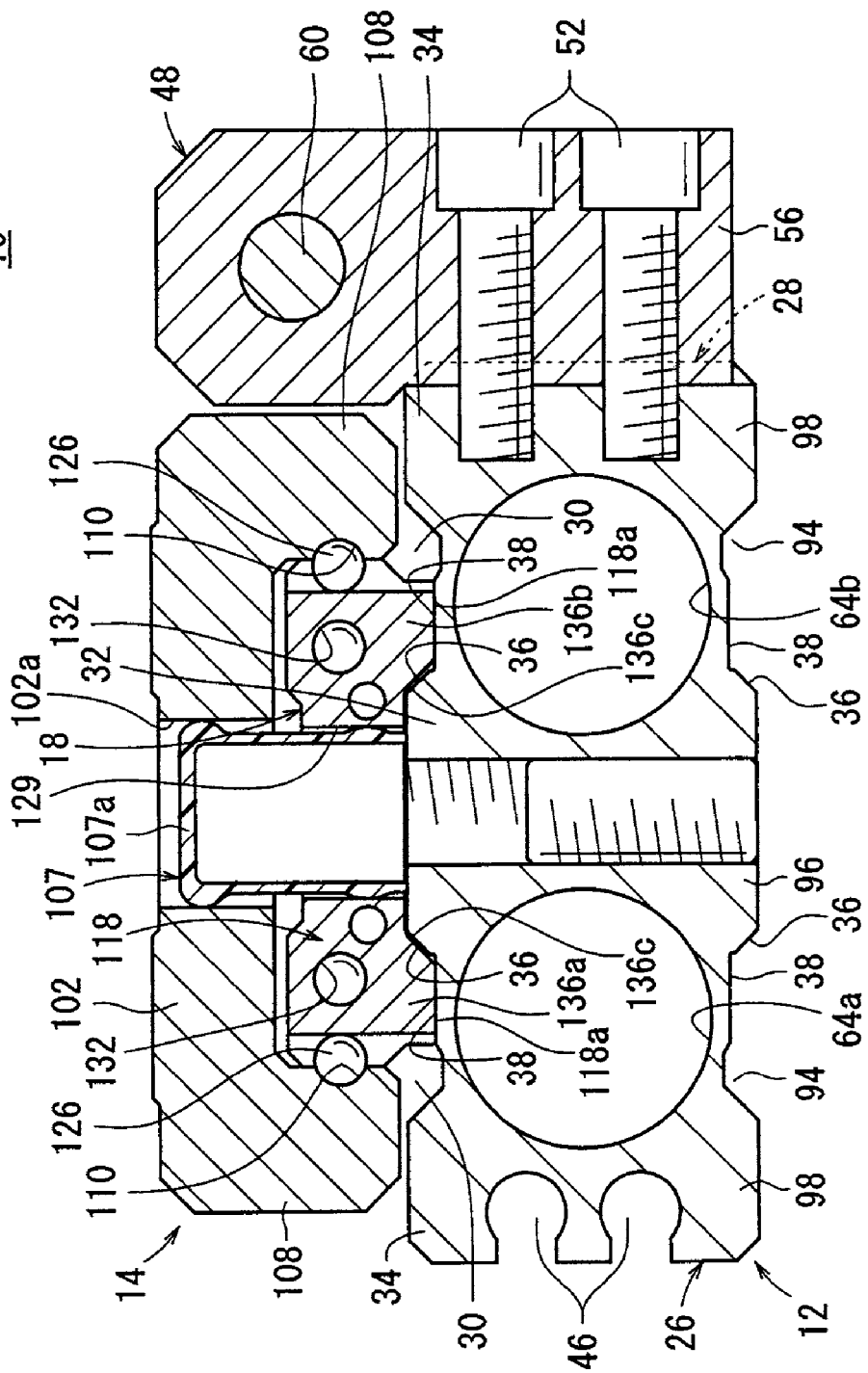
FIG. 7 is a cross sectional view taken along line VII-VII of FIG. 1.

Moreover, as shown in FIG. 7, a pair of guide members 136a, 136b, separated by a predetermined distance, extend in the axial direction on the bottom surface 118a of the guide block 118. The guide members 136a, 136b bulge outwardly at a given height from the bottom surface 118a, and further wherein the cross sectional configurations thereof are formed so as to gradually narrow in width in a direction moving away from the bottom surface 118a. Stated otherwise, concerning the guide members 136a, 136b, the mutually facing inner side surfaces 136c of the guide members 136a, 136b are formed in a substantially trapezoidal shape in cross section, inclined respectively at predetermined angles that gradually narrow in width, with the bottom surface 118a of the guide block 118 serving as a reference point.

In addition, when the guide block 118 is installed on the first guide surface 22 of the cylinder body 12, the pair of guide members 136a, 136b are inserted respectively into the first guide grooves 30, and end faces of the guide members 136a, 136b abut against the supporting surfaces 38 of the first guide grooves 30. Owing thereto, the guide block 118 is supported on the cylinder body 12, and the slide table 14 connected to the guide block 118 is displaceably supported with respect to the cylinder body 12.

Figure 9:
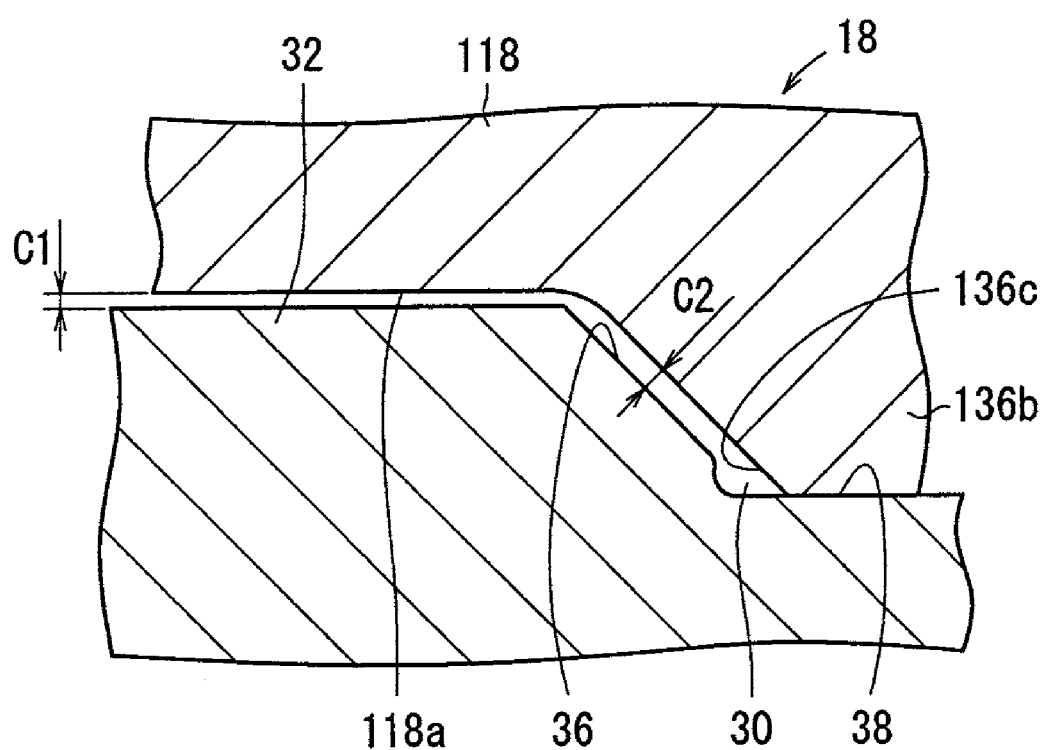
FIG. 9 is an enlarged cross sectional view showing a vicinity of a first guide surface and guide block of the cylinder body of FIG. 7.

On the other hand, as shown in FIG. 9, a clearance C1 of a predetermined interval is provided between the bottom surface 118a of the guide block 118 and the first bulging portion 32 of the cylinder body 12, and along therewith, additional clearances C2 of a predetermined interval are similarly provided between the inner side surfaces 136c of the guide members 136a, 136b and the tapered surfaces 36 of the first guide grooves 30. More specifically, in the guide block 118, only the end surfaces of the guide members 136a, 136b abut against the cylinder body 12 through the first guide grooves 30, and regions apart from the end surfaces of the guide members 136a, 136b are disposed in a non-contact state, via predetermined intervals, with respect to the cylinder body 12.

Furthermore, pin insertion holes (not shown) are formed and separated by a predetermined interval on the bottom surface 118a of the guide block 118, for insertion of the pair of pin members 16 therein. Further, a pair of attachment holes 44b into which screws are threaded are formed and penetrate through the guide block 118 at regions adjacent to the pin insertion holes. As a result, the pin members 16, which are installed in the cylinder body 12, are inserted into the bottom surface of the guide block 118, so that the guide block 118 is positioned with respect to the cylinder body 12, and the guide mechanism 18 including the guide block 118 is assembled onto an upper portion of the cylinder body 12 by threaded engagement of the connecting screws 42 into the attachment holes 44b.

Moreover, in the aforementioned linear actuator 10, as shown in FIG. 1, when observed from a side of the end plate 106 of the slide table 14, the fluid inlet/outlet ports 92a, 92b, the adjuster 48 and the stopper block 114 are arranged and positioned on the left side, whereas the sensor attachment grooves 46 are disposed on the right side.

The linear actuator 10 according to the embodiment of the present invention is basically constructed as described above. Next, operations and advantageous effects of the linear actuator 10 shall be described.

First, fluid under pressure from an unillustrated pressure fluid supply source is introduced into the one fluid inlet/outlet port 92a. In this case, the other fluid inlet/outlet port 92b is placed in a state of being open to atmosphere, by a switching operation of an unillustrated directional control valve.

As a result, the pressure fluid is supplied into the first cylinder chamber 86 through the communication passage 90a, from the second cylinder chamber 88 that communicates with the fluid inlet/outlet port 92a. The pistons 54 are pressed toward the end plate 106 of the slide table 14 (in the direction of the arrow A in FIG. 6) by the pressure fluid that has been introduced into the first and second cylinder chambers 86, 88. In addition, the floating bushes 73, which engage with the piston rods 70, are displaced by the pistons 54 in the direction of the arrow A, such that the slide table 14 is displaced integrally with the end plate 106, while the ball bearings 126 undergo rolling movement.

Owing thereto, the slide table 14 is displaced in a direction in which the end plate 106 moves away from the cylinder body 12 (in the direction of the arrow A) while being guided by the guide mechanism 18, wherein displacement of the slide table 14 is regulated by abutment of the stopper block 114, which is displaced together with the slide table 14, against the damper 62, whereupon the slide table 14 reaches its displacement terminal end position. In this case, the displacement amount of the slide table 14 can be arbitrarily adjusted by loosening the nut 58 and screw-rotating the adjustment bolt 60 with respect to the block 56.

On the other hand, in the case that the slide table 14 is displaced in an opposite direction to the above direction (in the direction of the arrow B), the pressure fluid is supplied to the other fluid inlet/outlet port 92b, while the one fluid inlet/outlet port 92a is placed in a state of being open to atmosphere under a switching action of the directional control valve (not shown). The pressure fluid is then introduced from the second cylinder chamber 88 into the first cylinder chamber 86 through the communication passage 90b, so that the pistons 54 are pressed toward the side of the end caps 76 (in the direction of the arrow B) by the pressure fluid supplied to the first and second cylinder chambers 86, 88.

As a result, through the floating bushes 73 that engage with the piston rods 70, the slide table 14 is displaced in the direction of the arrow B, such that the end plate 106 comes adjacent to the side of the cylinder body 12, and the slide table 14 is restored to its initial position shown in FIG. 1.

Next, an explanation shall be made of a case in which the first guide surface 22 on the aforementioned linear actuator 10 is oriented downwardly and fixed onto an installation surface 20 (see FIG. 4) of another apparatus (not shown), and in which the second guide surface 24 is oriented upwardly, and assembly direction of the cylinder body 12 is changed so that the slide table 14 is mounted with respect to the second guide surface 24.

First, the cylinder body 12, which initially is affixed to the installation surface 20 through the second guide surface 24, is removed from the installation surface 20, and the plural connecting screws 42 are screw-rotated and unthreaded so that the guide block 118 is detached from the cylinder body 12. The slide table 14 including the guide block 118 also is detached from the cylinder body 12.

Further, the stopper block 114, which is connected to one side surface on the table main body 102, is detached by unthreading the screws 116, together with detaching the adjuster 48, which is mounted onto the second side surface 28 of the cylinder body 12, similarly by unthreading the screws 52. In this case, since the table main body 102 that constitutes the slide table 14 is connected, through the cap 107, integrally with the guide block 118 making up the guide mechanism 18, the table main body 102 and the guide block 118 do not become disconnected from one another. Accordingly, the ball bearings 126 are maintained reliably between the guide block 118 and the slide table 14, and the ball bearings 126 are prevented from dropping out.

Figure 12:
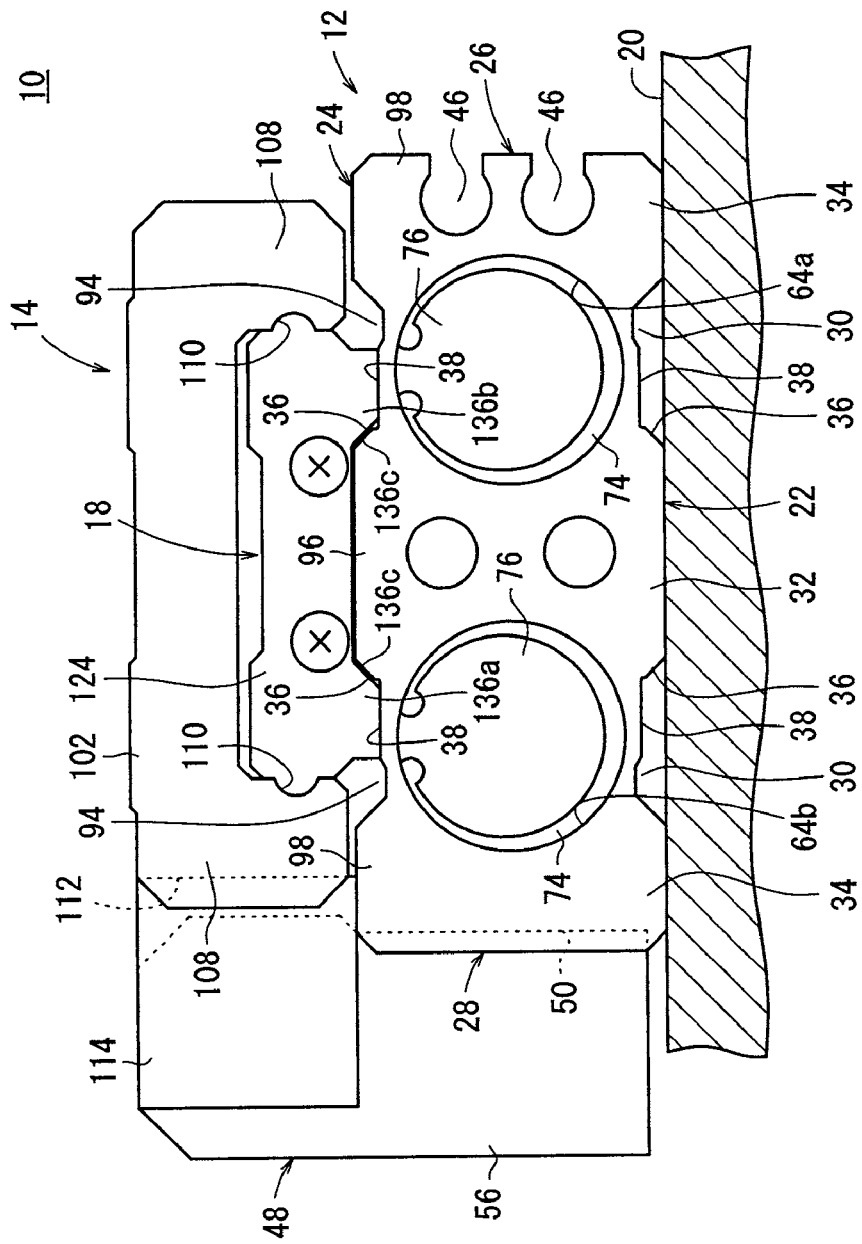
FIG. 12 is a side view of the linear actuator shown in FIG. 11.

Next, the cylinder body 12, which is initially placed such that the first guide surface 22 thereof faces upwardly as shown in FIG. 4, is inverted so that the first guide surface 22 now faces downwardly (see FIG. 12). Accordingly, the second guide surface 24 of the cylinder body 12 that formerly abutted against the installation surface 20 of the other apparatus is positioned upwardly, and the end surface made up of the first bulging portion 32 and the first mounting sections 34 constituting the first guide surface 22 abuts against the installation surface 20.

Additionally, the guide mechanism 18 is disposed with respect to the upwardly positioned second guide surface 24 of the cylinder body 12, wherein the guide members 136a, 136b of the guide block 118 are mounted while sandwiching the second bulging portion 96 therebetween and abutting against the second guide grooves 94. Further, after relatively positioning the cylinder body 12 and the guide block 118 by the pin members 16, the connecting screws 42, which are inserted through the attachment holes 44a of the cylinder body 12, are threaded respectively into the attachment holes 44b of the guide block 118, whereby the guide mechanism 18 is fixed with respect to the cylinder body 12.

Specifically, the guide members 136a, 136b of the guide block 118 constituting the guide mechanism 18 are fixed in a state of abutment against the supporting surfaces 38 of the second guide grooves 94.

At this time, because the second guide surface 24 having the second guide grooves 94 and the second bulging portion 96 is formed in the same shape as the first guide surface 22 on which the guide mechanism 18 was disposed before, a clearance C1 is formed between the bottom surface 118a of the guide block 118 and the second bulging portion 96, and further, clearances C2 are formed between inner side surfaces of the guide members 136a, 136b and the tapered surfaces 36 of the second guide grooves 94.

Figure 10:
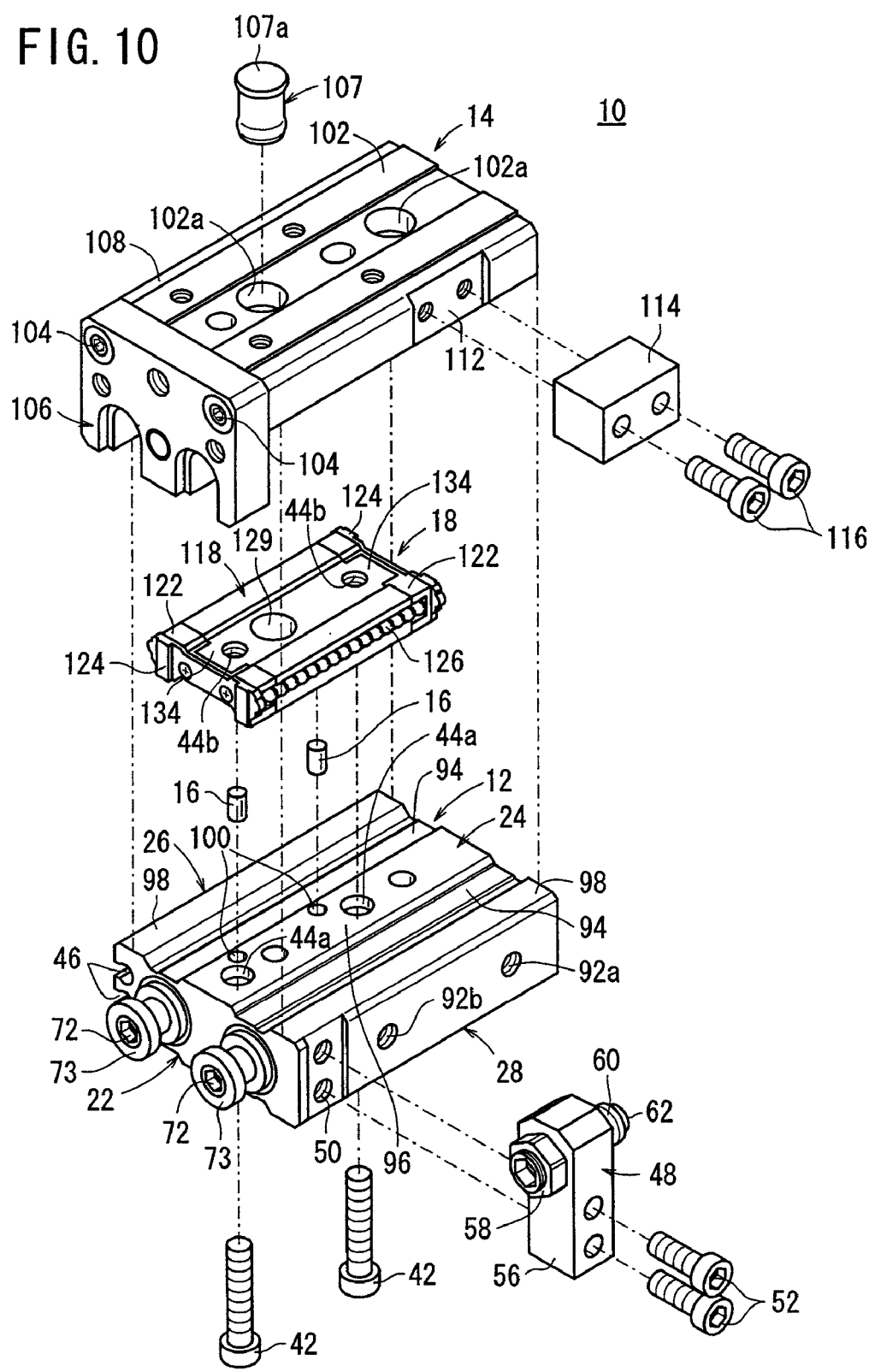
FIG. 10 is an exploded perspective view illustrating a case in which the cylinder body is reversed and the assembly direction is changed with respect to the slide table, in the linear actuator shown in FIG. 1.
Figure 11:
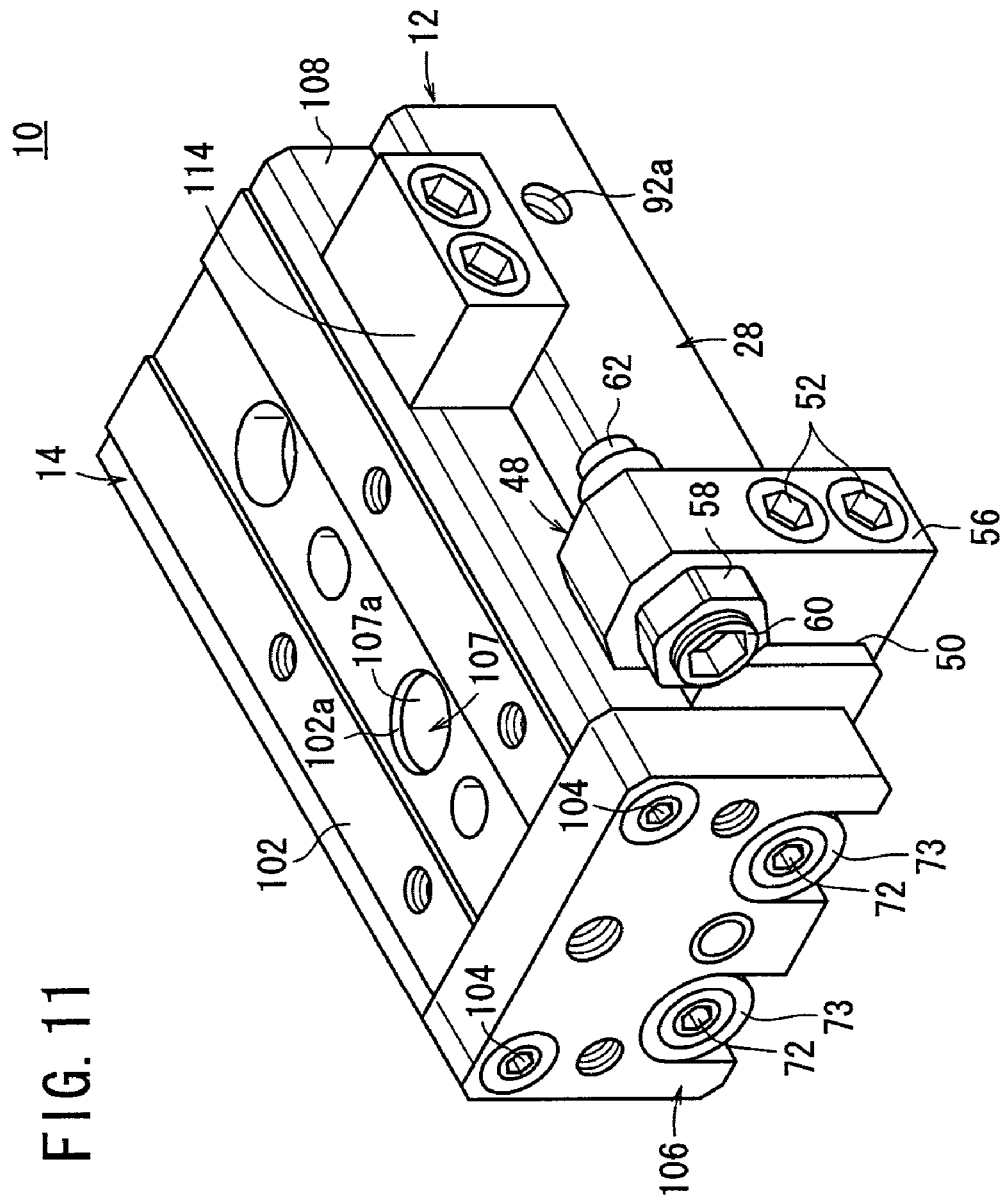
FIG. 11 is an exterior perspective view showing an assembled state of the linear actuator of FIG. 10.

Further, after the guide mechanism 18 has been installed onto the cylinder body 12, as shown in FIG. 10, the stopper block 114 is mounted in the second recess 112 of the table main body 102 and affixed thereto by screws 116, whereas the adjuster 48 is fixed via screws 52 to the second side surface 28 of the cylinder body 12, so as to face the stopper block 114 (see FIG. 11).

Finally, by placing the first guide surface 22 of the cylinder body 12 on the installation surface 20, the cylinder body 12 is made to abut against the installation surface 20 through the first bulging portion 32 and the first mounting sections 34, which are formed as substantially planar surfaces. By fixing the cylinder body 12 to the installation surface 20, the linear actuator 10 is mounted on another apparatus in a state wherein the attachment direction of the cylinder body 12 is changed with respect to the slide table 14.

More specifically, as shown in FIG. 11, the attachment direction of the cylinder body 12 with respect to the slide table 14 is changed, such that when viewed from the side of the end plate 106 of the slide table 14, the sensor attachment grooves 46 are arranged on the left side, and the fluid inlet/outlet ports 92a, 92b, the adjuster 48 and the stopper block 114 are arranged on the right side.

In the linear actuator 10, the case in which the attachment between the cylinder body 12 and the slide table 14 is changed again, so as to position the first guide surface 22 upwardly, is handled the same as the aforementioned case, in which the attachment direction is changed so that the second guide surface 24 of the cylinder body 12 is positioned upwardly.

As indicated above, with the present embodiment, the first and second guide surfaces 22, 24 on the cylinder body 12 have the same shape, respectively comprising pairs of first and second guide grooves 30, 94 capable of guiding the slide table 14 with respect to the first and second guide surfaces 22, 24, and first and second bulging portions 32, 96 disposed between the first and second guide grooves 30, 94. On the other hand, a pair of guide members 136a, 136b is disposed on the guide block 118, which is guided along the first and second guide grooves 30, 94.

As a result, the slide table 14 including the guide mechanism 18, and the adjuster 48, are removed from the cylinder body 12 once, and after the cylinder body 12 is arranged with either one of the first or second guide surfaces 22 or 24 defining the installation surface 20 side thereof, the slide table 14 and the adjuster 48 can be reinstalled on either one of the upwardly directed first guide surface 22 or second guide surface 24 of the cylinder body 12. In this manner, the relative assembly direction of the slide table 14 and the cylinder body 12 can be changed with a simple operation, and accordingly, a single linear actuator 10 can be responsive to changes in positioning and arrangement of the fluid inlet/outlet ports 92a, 92b, the adjuster 48 and the sensor attachment grooves 46.

As a result, it is unnecessary to prepare another additional linear actuator, having respective ports, sensor grooves, etc., on an opposite side surface to those of the linear actuator 10, corresponding to the use environment or intended use of the linear actuator 10. Thus, equipment costs needed for the linear actuator 10 can be suppressed, along with reducing management costs for the linear actuator 10.

Further, owing to the structure in which the sensor attachment grooves 46 are provided on a first side surface 26 on the cylinder body 12, whereas the fluid inlet/outlet ports 92a, 92b and a first recess 50 that enables mounting of the adjuster 48 are provided on the other second side surface 28, compared to a conventional linear actuator in which respective ports, sensor grooves and the like, are provided respectively on both side surfaces on the cylinder body, the first and second side surfaces 26, 28, which form both side surfaces of the cylinder body 12, can be of a minimal size (surface area). Accordingly, by minimizing the area of the first and second side surfaces 26, 28, the cylinder body 12 can be made small in size, and along therewith, the linear actuator 10 can be made even thinner in profile.

Furthermore, when the guide mechanism 18 is mounted on the first guide surface 22 or the second guide surface 24 on the cylinder body 12, a clearance C1 is provided between the first and second bulging portions 32, 96 and the bottom surface 118a of the guide block 118, and further, clearances C2 are provided between the tapered surfaces 36 of the first and second guide grooves 30, 94 and the inner side surfaces 136c of the guide members 136a, 136b. Owing thereto, for example, even in cases where the first and second bulging portions 32, 96, or the first and second mounting sections 34, 98, which are mounted on the installation surface 20, become deformed for any reason, such deformations can be absorbed by the clearances C1, C2, and contact of such a deformed cylinder body 12 with respect to the guide block 118 is prevented. As a result, no adverse effect is incurred by deformation of the cylinder body 12, and the slide table 14 including the guide mechanism 18 can be reliably and effectively assembled onto the cylinder body 12.

Still further, by providing the first and second pin insertion holes 40, 100 respectively on the first and second guide surfaces 22, 24 of the cylinder body 12, and by inserting the pair of pin members 16, which have been inserted into the first and second pin insertion holes 40, 100, into corresponding pin insertion holes of the guide block 118, positioning between the cylinder body 12 and the guide block 118 can be reliably and easily carried out. Stated otherwise, when assembling the cylinder body 12 and the slide table 14 including the guide block 118 together, reproducibility of such relative positioning can be enhanced.

Moreover, the cap 107 is detachably provided and disposed with respect to the first hole 102a of the slide table 14 and the second hole 129 of the guide block 118 constituting the guide mechanism 18. As a result, since the slide table 14 and the guide block 118 can be easily and securely connected through the cap 107, workability can be enhanced when reassembly of the slide table 14 is carried out.

The linear actuator according to the present invention is not limited to the above-described embodiment, and various other structures may be adopted as a matter of course, which to not deviate from the essential features and gist of the present invention.

What is claimed is:

1. A linear actuator having a slide table that moves reciprocally in an axial direction of a cylinder body by means of a pressure fluid introduced from fluid inlet/outlet ports, comprising:
a cylinder body having a cylinder chamber into which said pressure fluid is introduced, one side surface extending along the axial direction and in which fluid inlet/outlet ports are formed, another side surface in which an installation groove is formed for enabling installation of a detector for detecting a displacement amount of a piston disposed inside said cylinder chamber, and a pair of guide surfaces disposed substantially perpendicular to said side surfaces;
mounting sections formed substantially parallel to an axis of said cylinder body and in substantially the same plane on said guide surfaces;
a pair of grooves arranged symmetrically with respect to the axis of said cylinder body and recessed at a predetermined depth with respect to said mounting sections on said guide surfaces;
a slide table disposed facing one of said guide surfaces and displaceable along the axial direction of said cylinder body;
a cylinder mechanism effecting reciprocal movement of said slide table, under a displacement action of the piston disposed inside said cylinder chamber; and
a guide mechanism, having a guide block mounted on one of said pair of guide surfaces and formed with circulating passages therein for rolling circulation of a plurality of rolling bodies, and for guiding said slide table along the axial direction of said cylinder body,
wherein guide members of said guide block are inserted and supported respectively in said grooves, and
wherein said guide mechanism is detachably mounted with respect to said guide surfaces, such that when said guide mechanism is mounted on said one guide surface, the other guide surface serves as a mounting surface for fixing said cylinder body to another component.

2. The linear actuator according to claim 1, wherein a clearance is provided, which defines a predetermined interval between a bottom surface of said guide block and said guide surfaces.

3. The linear actuator according to claim 2, wherein said mounting sections are disposed on an axis of said cylinder body, and wherein a tapered surface, disposed between said mounting sections and said grooves, is provided across a clearance of a predetermined interval with respect to the guide members of said guide block.

4. The linear actuator according to claim 1, wherein a positioning mechanism is disposed between said guide block and said cylinder body, which performs relative positioning between said guide block and said cylinder body.

5. The linear actuator according to claim 4, wherein said positioning mechanism comprises a pair of pins inserted into holes in said cylinder body and into a bottom surface of said guide block.

6. The linear actuator according to claim 1, wherein a connecting member mutually connecting said slide table and said guide block is installed in said slide table and said guide block.

7. The linear actuator according to claim 6, wherein said connecting member is formed in the shape of a bottomed cylinder from an elastic material, which is inserted respectively into a hole of said slide table and into a hole of said guide block.

8. The linear actuator according to claim 1, wherein an adjuster, which is capable of adjusting a displacement amount of said slide table, is disposed on one side surface on said cylinder body.

9. A linear actuator having a slide table that moves reciprocally in an axial direction of a cylinder body by means of a pressure fluid introduced from fluid inlet/outlet ports, comprising:
   a cylinder body having a cylinder chamber into which said pressure fluid is introduced, one side surface extending along the axial direction and in which fluid inlet/outlet ports are formed, another side surface in which an installation groove is formed for enabling installation of a detector for detecting a displacement amount of a piston disposed inside said cylinder chamber, and a pair of guide surfaces disposed substantially perpendicular to said side surfaces;
   a slide table disposed facing one of said guide surfaces and displaceable along the axial direction of said cylinder body;
   a cylinder mechanism effecting reciprocal movement of said slide table, under a displacement action of the piston disposed inside said cylinder chamber; and
   a guide mechanism, having a guide block mounted on one of said pair of guide surfaces and formed with circulating passages therein for rolling circulation of a plurality of rolling bodies, and for guiding said slide table along the axial direction of said cylinder body,
   wherein said guide mechanism is detachably mounted with respect to said guide surfaces, and
   wherein a connecting member mutually connecting said slide table and said guide block is installed in said slide table and said guide block.

10. The linear actuator according to claim 9, wherein said connecting member is formed in the shape of a bottomed cylinder from an elastic material, which is inserted respectively into a hole of said slide table and into a hole of said guide block.

11. The linear actuator according to claim 9, wherein said guide mechanism is mounted on said one guide surface, and the other guide surface serves as a mounting surface when said cylinder body is affixed to another component.

12. The linear actuator according to claim 11, further comprising:
   mounting sections formed substantially parallel to an axis of said cylinder body and in substantially the same plane on said guide surfaces; and
   a pair of grooves arranged symmetrically with respect to the axis of said cylinder body and recessed at a predetermined depth with respect to said mounting sections on said guide surfaces,
   wherein guide members of said guide block are inserted and supported respectively in said grooves, and wherein a clearance is provided, which defines a predetermined interval between a bottom surface of said guide block and said guide surfaces.

13. The linear actuator according to claim 12, wherein said mounting sections are disposed on an axis of said cylinder body, and wherein a tapered surface, disposed between said mounting sections and said grooves, is provided across a clearance of a predetermined interval with respect to the guide members of said guide block.

14. The linear actuator according to claim 9, wherein a positioning mechanism is disposed between said guide block and said cylinder body, which performs relative positioning between said guide block and said cylinder body.

15. The linear actuator according to claim 14, wherein said positioning mechanism comprises a pair of pins inserted into holes in said cylinder body and into a bottom surface of said guide block.

16. The linear actuator according to claim 9, wherein an adjuster, which is capable of adjusting a displacement amount of said slide table, is disposed on one side surface on said cylinder body.

* * * * *